United States Patent
Aleksander

(10) Patent No.: US 12,504,318 B2
(45) Date of Patent: Dec. 23, 2025

(54) MONITORING OF THE STATE OF HEALTH OF AT LEAST TWO VIBRATION SENSORS OF A BYPASS TURBOMACHINE

(71) Applicant: SAFRAN AIRCRAFT ENGINES, Paris (FR)

(72) Inventor: Boris Aleksander, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 947 days.

(21) Appl. No.: 17/424,784

(22) PCT Filed: Feb. 5, 2020

(86) PCT No.: PCT/FR2020/050192
§ 371 (c)(1),
(2) Date: Jul. 21, 2021

(87) PCT Pub. No.: WO2020/161437
PCT Pub. Date: Aug. 13, 2020

(65) Prior Publication Data
US 2022/0065689 A1    Mar. 3, 2022

(30) Foreign Application Priority Data
Feb. 5, 2019    (FR) .................................... 1901111

(51) Int. Cl.
*G01H 3/00*    (2006.01)
*F01D 21/00*    (2006.01)

(52) U.S. Cl.
CPC ........... *G01H 3/005* (2013.01); *F01D 21/003* (2013.01); *F05D 2220/323* (2013.01);
(Continued)

(58) Field of Classification Search
CPC ...... G01H 3/005; G01H 1/006; F01D 21/003; F01D 17/02; F01D 25/04;
(Continued)

(56) References Cited

U.S. PATENT DOCUMENTS

| 2018/0354646 A1* | 12/2018 | Nakhjavani | ........... G01M 15/14 |
| 2020/0116554 A1* | 4/2020 | Abboud | ................. G01H 1/003 |
| 2022/0065689 A1* | 3/2022 | Aleksander | ............ G01H 3/005 |

FOREIGN PATENT DOCUMENTS

| FR | 2618899 A1 * | 2/1989 |
| FR | 2 960 319 A1 | 11/2011 |

(Continued)

OTHER PUBLICATIONS

International Search Report dated May 11, 2020 in International Application No. PCT/FR2020/050192.
(Continued)

*Primary Examiner* — Shelby A Turner
*Assistant Examiner* — Yaritza H Perez Bermudez
(74) *Attorney, Agent, or Firm* — Sughrue Mion, PLLC

(57) ABSTRACT

The invention relates to a monitoring process of the state of health of at least two vibration sensors of a twin turbomachine comprising a low-pressure body and a high-pressure body, a vibration sensor being located at the front of the turbomachine, a vibration sensor being located at the rear of the turbomachine, each of the sensors being configured to measure vibrations of the low-pressure and high-pressure bodies at the front and at the rear of the turbomachine, the process being executed in a processing unit (20) of the turbomachine communicating with each of the sensors and comprising the following steps:

reception of the low-pressure (NBP) and high-pressure (NHP) speeds of the turbomachine and when said speeds are simultaneously in predetermined ranges,
(Continued)

reception of the front and rear vibratory levels of the low- and high-pressure bodies registered by each sensor;

determination of the average of the values of the vibratory levels of the low- and high-pressure bodies received over a predetermined reception period;

determination of the state of health of said at least first and second vibration sensors from comparison of the average values of the vibratory levels of the low- and high-pressure bodies determined at predetermined thresholds.

15 Claims, 3 Drawing Sheets

(52) U.S. Cl.
CPC ...... *F05D 2260/80* (2013.01); *F05D 2260/83* (2013.01); *F05D 2270/334* (2013.01)

(58) Field of Classification Search
CPC ........... F05D 2220/323; F05D 2260/80; F05D 2260/83; F05D 2260/96; F05D 2270/334
See application file for complete search history.

(56) References Cited

FOREIGN PATENT DOCUMENTS

| | | | |
|---|---|---|---|
| FR | 2997495 A1 * | 5/2014 | ............. G01H 3/005 |
| FR | 3064064 A1 * | 9/2018 | ............. F01D 5/027 |
| GB | 2 208 548 A | 4/1989 | |

OTHER PUBLICATIONS

Written Opinion of the International Searching Authority dated May 11, 2020 in International Application No. PCT/FR2020/050192.
French Search Report with written opinion dated Oct. 14, 2019 in French Application No. 1901111.

* cited by examiner

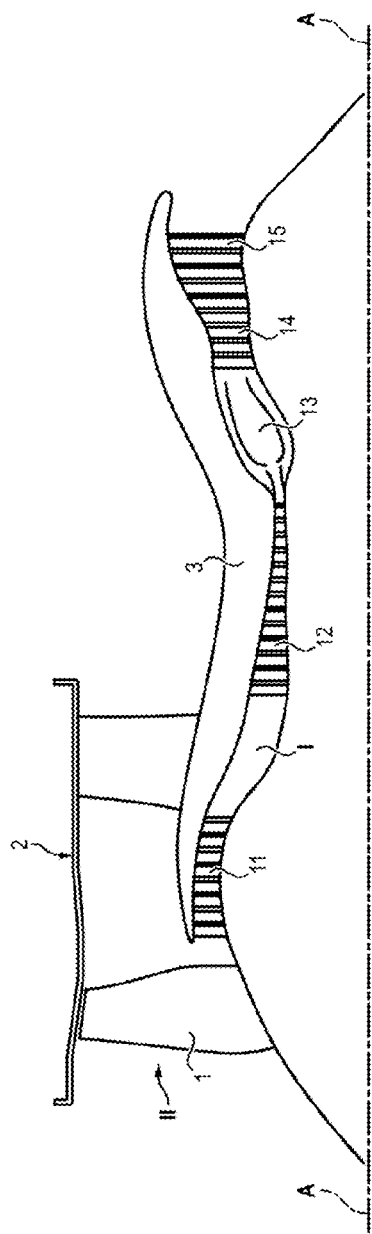
[Fig. 1]

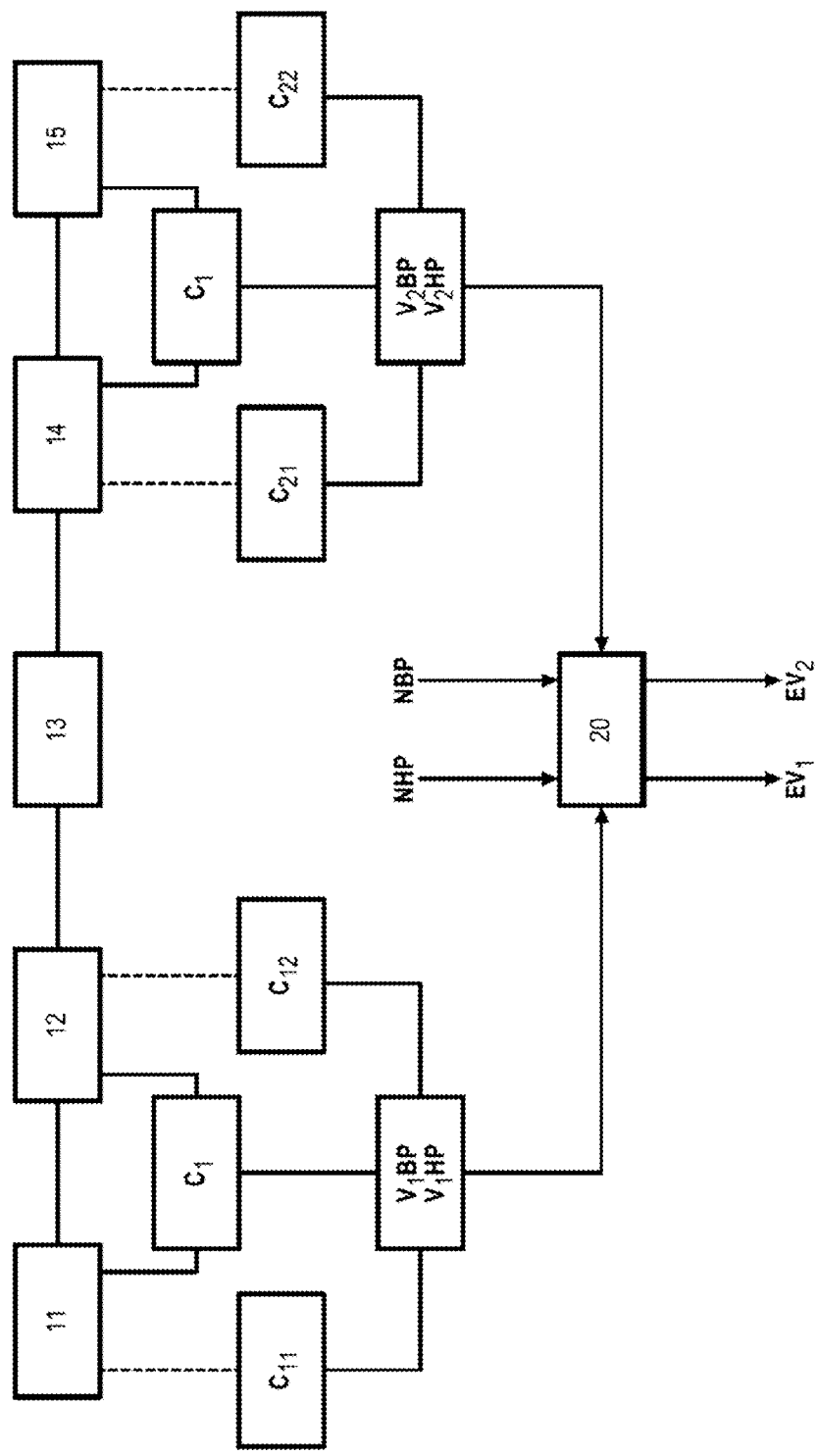
[Fig. 2]

[Fig. 3]
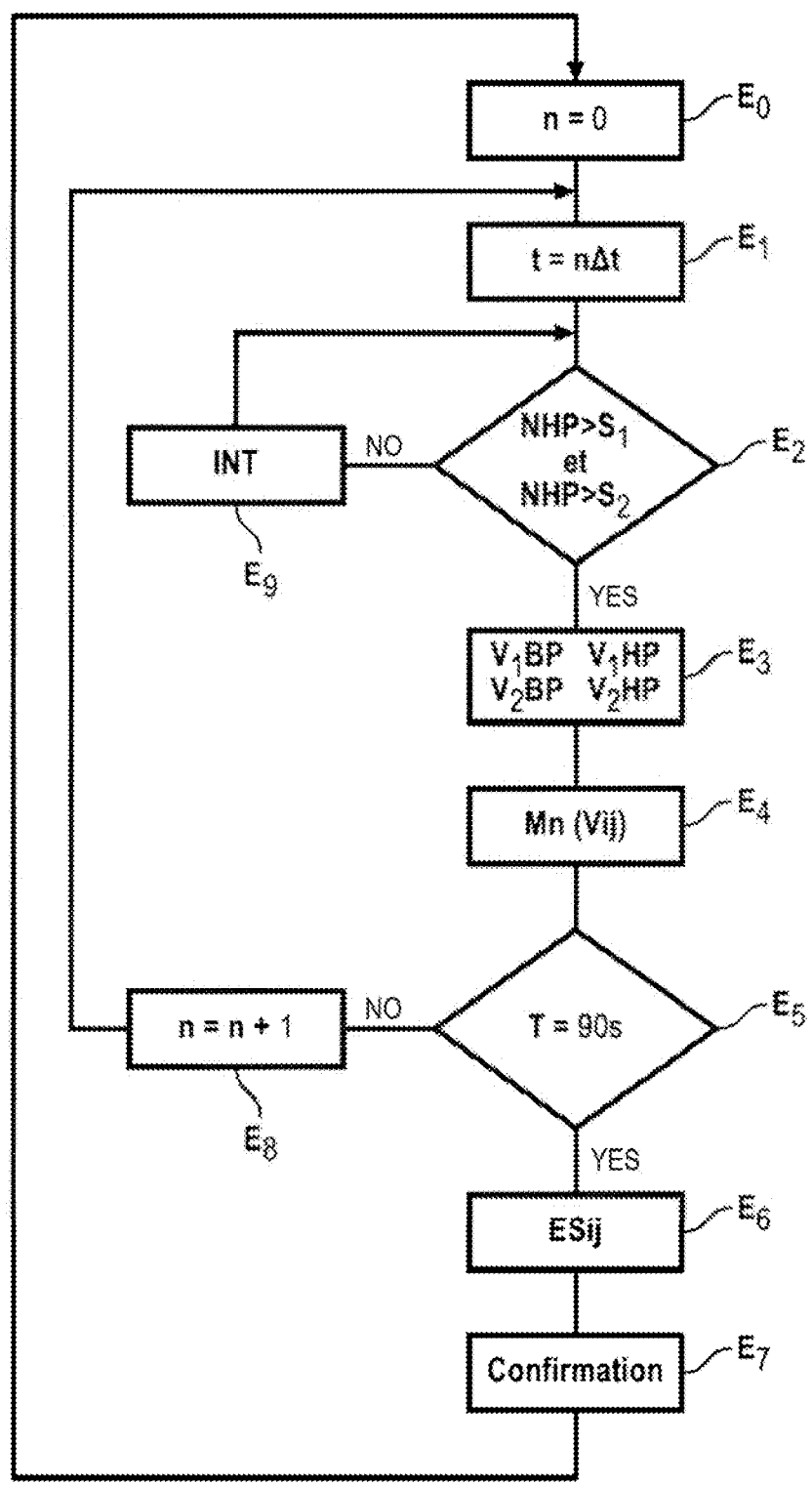

MONITORING OF THE STATE OF HEALTH OF AT LEAST TWO VIBRATION SENSORS OF A BYPASS TURBOMACHINE

CROSS REFERENCE TO RELATED APPLICATIONS

This application is a National Stage of International Application No. PCT/FR2020/050192 filed Feb. 5, 2020, claiming priority based on French Patent Application No. 1901111 filed Feb. 5, 2019, the entire contents of each of which are herein incorporated by reference in their entireties.

GENERAL TECHNICAL FIELD

The invention relates to the monitoring of the state of health of a bypass turbomachine of an aircraft and more particularly by means of the monitoring of vibratory levels in the turbomachine. And the invention relates even more particularly to the monitoring of vibration sensors used for this purpose.

PRIOR ART

The state of health of a turbomachine is conventionally monitored by all kinds of sensors. Of these, vibration sensors are indispensable as they quickly detect when a part is broken, an increase in clearance and any other failure capable of endangering the turbomachine.

In the direction of circulation of air flow a bypass turbomachine conventionally comprises a fan, a low-pressure compressor, a high-pressure compressor, a combustion chamber, a high-pressure turbine and a low-pressure turbine.

A known solution for monitoring vibrations of the turbomachine is to arrange a vibratory sensor at the front of the turbomachine and another vibratory sensor at the rear of the turbomachine.

Each of these sensors arranged in this way carries out monitoring of the low-pressure and high-pressure vibratory levels (that is, the low-pressure body and the high-pressure body of the turbomachine) by means of filters controlled on the speeds low-pressure and high-pressure.

To ensure reliability of this monitoring of vibratory levels, it should be ensured that the vibration sensors are operating correctly to immediately raise abnormal vibratory levels of the turbomachine.

It is known to monitor the state of health of the vibration sensors on a stability criterion of vibratory levels detected during the take-off and post-flight phases to perform this verification.

Such detection rationale however has limits, with false vibration sensor failures being wrongly declared.
- The monitoring phases are not optimal, the vibratory levels in these phases are often below the detection levels of a sensor breakdown;
- During operating at high temperature, since the speed of the turbomachine is higher than during operating at nominal temperature it can indicate that it is in a monitoring phase, and levels are not being registered during the provided phase, all the more so as they can also be below the detection levels of a sensor breakdown.

PRESENTATION OF THE INVENTION

At least one aim of the invention is to define a detection rationale for failures of vibratory sensors aimed at ensuring that only those sensors actually failing are declared as such.

To achieve this aim, the invention relates to a monitoring process of the state of health of at least two vibration sensors of a bypass turbomachine comprising a low-pressure body and a high-pressure body, a vibration sensor being located at the front of the turbomachine, a vibration sensor being located at the rear of the turbomachine, each of the sensors being configured to measure vibrations of the low-pressure and high-pressure bodies at the front and at the rear of the turbomachine, the process being executed in a processing unit (20) of the turbomachine communicating with each of the sensors and comprising the following steps:
- reception of the low-pressure (NBP) and high-pressure (NHP) speeds of the turbomachine and when said speeds are simultaneously in predetermined ranges,
- reception of the front and rear vibratory levels of the low- and high-pressure bodies registered by each sensor;
- determination of the average of the values of the vibratory levels of the low- and high-pressure bodies received over a predetermined reception period;
- determination of the state of health of said at least first and second vibration sensors from comparison of the average values of the vibratory levels of the low- and high-pressure bodies determined at predetermined thresholds.

The invention is advantageously completed by the following characteristics taken singly or in any one of their technically possible combinations.

During the reception step the process comprises a verification step of the low-pressure and high-pressure speeds, the process comprising interruption of reception of the vibratory levels by the processing unit if the speeds are not simultaneously in the predetermined ranges.

The determined average is an average of the received values of the vibratory levels of the low- and high-pressure bodies determined for a number of received values, which corresponds to the predetermined reception period, the average can be determined instantaneously during reception.

The two-sensor monitoring process has one sensor being configured to measure the vibration levels of the low-pressure body and the high-pressure body at the front of the turbomachine, the other being configured to measure the vibration levels of the low-pressure body and the high-pressure body at the rear of the turbomachine, the state of health of a sensor being considered as poor if the average values of the vibratory levels of the low-pressure and high-pressure bodies are less than predetermined thresholds, and if for the other sensor the average values of the vibratory levels of the low-pressure and high-pressure bodies are greater than predetermined thresholds.

The four-sensor monitoring process has two sensors at the front of the turbomachine configured to measure respectively the vibration levels of the low-pressure and high-pressure bodies at the front, two sensors at the rear of the turbomachine configured to measure respectively the vibration levels of the low-pressure and high-pressure bodies at the rear, the state of health of a sensor of the vibratory levels of the low-pressure body being considered as poor if the average value of the vibratory levels is less than a predetermined threshold, and if for the other sensor the average value of the vibratory levels is greater than a predetermined threshold, the state of health of a sensor of the vibratory levels of the high-pressure body being considered as poor if the average value of the vibratory levels is less than a predetermined threshold, and if for the other sensor the average value of the vibratory levels is greater than a predetermined threshold.

The process comprises confirmation of the good or poor state of health of a sensor once the sensor exhibits the same state of health three times consecutively.

By way of example, a predetermined vibratory threshold for the low-pressure body is between 0.1 and 0.2 cm/s, typically 0.16 cm/s.

By way of example, a predetermined vibratory threshold for the high-pressure body is between 0.05 and 0.15 cm/s, typically 0.10 cm/s.

The predetermined range for the low-pressure speed is between 10500 rpm and 13500 rpm and wherein the predetermined range for the speed high-pressure is between 14500 rpm and 17500 rpm.

The invention also relates to a bypass turbomachine comprising a processing unit configured to execute a process according to the invention.

The invention has many advantages.

Detection of failures is more robust than by means of known solutions.

In fact, detection is done at higher speeds (therefore more 'vibrant') and the need to confirm calculation of averages several times also makes the reality more robust for the sensor failure.

False failures are therefore limited.

It is possible to rehabilitate a sensor which has been declared faulty.

PRESENTATION OF THE FIGURES

Other characteristics, aims and advantages of the invention will emerge from the following description which is purely illustrative and non-limiting and which must be considered in conjunction with the appended drawings, in which:

FIG. 1 schematically illustrates a bypass turbomachine,

FIG. 2 illustrates architecture for executing the process according to the invention;

FIG. 3 illustrates steps of a process according to the invention.

In all figures similar elements bear identical reference numerals.

DETAILED DESCRIPTION OF THE INVENTION

FIG. 1 shows a bypass turbomachine of an aircraft, comprising from upstream to downstream in the direction of gas flow (according to the engine axis AA) a ducted fan 1, a primary annular flow space I and a secondary annular flow space II (secondary duct) delimited by an external casing 2 and an internal hub 3. In the primary duct I the turbomachine comprises a low-pressure compressor 11, a high-pressure compressor 12, a combustion chamber 13, a 14 high-pressure turbine and a 15 low-pressure turbine.

The turbomachine therefore comprises a low-pressure body and a high-pressure body at the front and at the rear (in the direction of gas flow).

As mentioned at the outset vibration sensors are arranged at the front and at the rear to measure vibrations of the low-pressure and high-pressure bodies.

As illustrated schematically in FIG. 2, according to an embodiment a sensor C1 measures vibrations V1BP, V1HP of the low-pressure and high-pressure bodies at the front, and a sensor C2 measures vibrations V2BP, V2HP of the low-pressure and high-pressure bodies at the rear.

According to this embodiment, a single sensor is arranged at the rear and a single sensor is arranged at the front, each measuring the vibrations of the low-pressure and high-pressure bodies at the same time. To achieve this, filtering of received vibrations must be performed so that vibrations coming from the low-pressure body can be separated out from those coming from the high-pressure body.

By way of variant, four sensors can be provided, two at the front and two at the rear. In this variant a sensor C11 measures vibrations V1BP of the low-pressure body at the front, a sensor C12 measures vibrations V1HP of the high-pressure body at the front, a sensor C21 measures vibrations V2BP of the low-pressure body at the rear and a sensor C22 measures vibrations V2HP of the high-pressure body at the rear.

Such vibration sensors comprise accelerometers for example.

The sensors can be arranged at several points on the turbomachine. For example, to measure vibrations at the front of the low-pressure body a sensor can be arranged in the region of the low-pressure compressor. To measure vibrations at the front of the high-pressure body a sensor can be arranged in the region of the high-pressure compressor. To measure vibrations at the rear of the high-pressure body a sensor can be arranged in the region of the high-pressure turbine. To measure vibrations at the rear of the low-pressure body a sensor can be arranged in the region of the low-pressure turbine.

As mentioned in the introduction, these vibration sensors need to be monitored. Such monitoring is executed in a processing unit 20 by means of a process for monitoring the state of health of vibration sensors described below in relation to FIG. 3.

Monitoring of the state of health of vibration sensors is based on harnessing vibratory measurements originating from sensors in low-pressure and high-pressure speed ranges for which the vibratory levels are pertinent.

By way of advantage, vibratory levels are registered for monitoring over periods T. This period T must be high enough to have an average of sufficiently high measurements of vibratory levels (in the case of an integrated sensor) and therefore be above the detection threshold of a failed sensor. In fact, statistically the greater the calculation time of the average, the higher the calculated average minimum. This period T must also be low enough to let the system be within the detection ranges long enough to ensure at least 3 averaging calculations during a flight. This period is preferably between 60 and 120 s and is preferably equal to 90 s.

At the start of the process, the calculation step n is initialised at n=0 (step E0) and the period $t = n \cdot \Delta t$ is calculated (step E1) with $\Delta t$ the registration period of the vibratory levels.

After these different initialisations, the processing unit 20 receives E2 the low-pressure NBP and high-pressure NHP speeds and when these speeds are simultaneously in predetermined ranges the processing unit 20 receives (step E3) vibratory levels V1BP, V2BP, V1HP, V2HP originating from the vibration sensors to be monitored.

The ranges of the low-pressure NBP and high-pressure NHP speeds are preferably the following:

NBP=[10500; 13500] rpm;
NHP=[14500; 17500] rpm.

Such speeds are determined for example by statistical study of the vibratory levels actually seen by the engine at different speeds. The speeds of the monitoring rationale are therefore selected as a function of the vibratory values relative to the threshold and/or the threshold is selected as a function of the pertinence of speeds originating from the statistical study.

In the case of two sensors, one at the front, one at the rear, each sensor C1, C2 acquires two vibratory levels:

The sensor C1 at the front acquires the vibratory low-pressure V1BP and high-pressure V1HP levels;

The sensor C2 at the rear acquires the vibratory low-pressure V2BP and high-pressure V2HP levels.

In the case of four sensors, two at the front, two at the rear, each sensor C11, C12, C21, C22 acquires a vibratory level:

The sensor C11 at the front acquires the vibratory levels V1BP of the low-pressure front body;

The sensor C12 at the front acquires the vibratory levels V1HP of the high-pressure body;

The sensor C21 at the rear acquires the vibratory levels V2BP of the low-pressure body;

The sensor C22 at the rear acquires the vibratory levels V2HP of the high-pressure body.

From the received values the processing unit 20 calculates (step E4) the instantaneous average of each vibratory level as follows:

$$M_n(Vij) = \frac{M_{n-1}(Vij) \cdot (n-1)}{n} + \frac{Vij}{n}$$

with i={1, 2} and J={BP, HP}.

The instantaneous average is calculated at each step n over the period T and at each calculation step n is incremented by 1 (step E8). On completion of the period T, the averages M1BP, M1HP of the levels of the low-pressure and high-pressure bodies measured by the front sensor or sensors;

M2BP, M2HP of the levels of the low-pressure and high-pressure bodies measured by the rear sensor or sensors;

are obtained.

As an alternative, the average can be calculated once all the values of the vibratory levels are acquired over a total period T, meaning that the values are stored progressively.

In a complementary way, to ensure that the low- and high-pressure speeds are in the predetermined ranges simultaneously, prior to each reception of the vibratory levels the processing unit 20 verifies (step E2) the values of the low- and high-pressure speeds. If this is not the case, the processing unit 20 interrupts (INT) (step E9) reception of the vibratory levels to calculate the average. However, as soon as the speeds regain the predetermined ranges the processing unit 20 returns to where it had stopped.

When an averaged number of vibratory levels corresponds to a period T=90 s (step E5) the processing unit 20 determines (step E6) the state of health of each sensor.

The state of health of a sensor is obtained from a comparison of each average M1BP, M1HP, M2BP, M2H at a vibratory threshold.

The threshold low-pressure SBP is typically between 0.1 and 0.2 cm/s preferably 0.16 cm/s The threshold high-pressure SHP is typically between 0.05 and 0.15 cm/s, preferably 0.10 cm/s.

Here too, these different thresholds originate from a statistical study.

In the case of two sensors, the state of health ESij of a sensor is considered as poor if the average values of the vibratory levels of the low-pressure and high-pressure bodies are less than the thresholds SBP, SHP respectively, and if for the other sensor the average values of the vibratory levels of the low-pressure and high-pressure bodies are greater than the thresholds SBP, SHP respectively.

As an alternative, in the case of four sensors, the state of health ESij of a sensor of the vibratory levels of the low-pressure body is considered as poor if the average value of the vibratory levels is less than the threshold SBP, and if for the other sensor the average value of the vibratory levels of the low-pressure body is greater than the threshold SBP; the state of health of a sensor of the vibratory levels of the high-pressure body is considered as poor if the average value of the vibratory levels of the high-pressure body is less than the threshold SHP, and if for the other sensor the average value of the vibratory levels of the high-pressure body is greater than the threshold SHP.

From the state of health determined in this way, the processing unit 20 performs confirmation (step E7) of the state of health of the good or poor state of health of a sensor once the sensor exhibits the same state of health three times consecutively.

It is therefore possible to rehabilitate a sensor the state of health of which would have been confirmed as poor.

The invention claimed is:

1. A process for monitoring the state of health of at least two vibration sensors of a bypass turbomachine that comprises a low-pressure body and a high-pressure body, a front vibration sensor that is located at the front of the turbomachine and that measures vibration levels of the low-pressure body and the high-pressure body at the front of the turbomachine, a rear vibration sensor that is located at the rear of the turbomachine and that measures vibration levels of the low-pressure body and the high-pressure body at the rear of the turbomachine, the process being executed in a processing unit of the turbomachine that communicates with the front vibration sensor and with the rear vibration sensor, the process comprising:

receiving a low-pressure speed and a high-pressure speed of the turbomachine;

when both the low-pressure speed and the high-pressure speed are simultaneously within respective predetermined ranges, determining an average of the vibration levels of the low-pressure body and the vibration levels of the high-pressure body from the front vibration sensor and the rear vibration sensor during a predetermined reception period;

when both the low-pressure speed and the high-pressure speed are not simultaneously within the respective predetermined ranges, interrupting reception of the vibration levels from the front vibration sensor and the rear vibration sensor such that the vibration levels from the front vibration sensor and the rear vibration sensor are not used in the average during the predetermined reception period; and determining a state of health of one of the front vibration sensors and the rear vibration sensor based on the average value of the vibration levels during the predetermined reception period.

2. The process according to claim 1, wherein the determined average is an average of the received values of the vibratory levels of the low-pressure and high-pressure bodies determined for a number of received values, which corresponds to the predetermined reception period, the average determined instantaneously during reception.

3. The process according to claim 1, wherein the state of health of one sensor of the front vibration senor and the rear vibration sensor being considered as poor if the average values of the vibratory levels of the low-pressure and high-pressure bodies are less than predetermined thresholds, and if, for the other sensor of the front vibration sensor and the rear vibration sensor, the average values of the vibratory levels of the low-pressure and high-pressure bodies are greater than predetermined thresholds.

4. The process according to claim 1, wherein:
the front vibration sensor is configured to measure vibration levels of the low-pressure body at the front of the turbomachine and the rear vibration sensor is configured to measure vibration levels of the low-pressure body at the rear of the turbomachine,
the turbomachine further comprises an additional front vibration sensor configured to measure vibration levels of the high-pressure body at the front of the turbomachine, and an additional rear vibration sensor configured to measure vibration of the high-pressure body at the rear of the turbomachine,
the state of health of one sensor of the front vibration sensor and the rear vibration sensor of the low-pressure body being considered as poor if the average value of the vibratory levels of the low-pressure body is less than a predetermined threshold, and if, for the other sensor of the front vibration sensor and the rear vibration sensor, the average value of the vibratory levels of the low-pressure body is greater than a predetermined threshold, and
the state of health of one sensor of the additional front vibration sensor and the additional rear vibration sensor of the high-pressure body being considered as poor if the average value of the vibratory levels of the high-pressure body is less than a predetermined threshold, and if, for the other sensor of the additional front vibration sensor and the additional rear vibration sensor, the average value of the vibratory levels of the high-pressure body is greater than a predetermined threshold.

5. The process according to claim 1, wherein the processing unit is further configured to confirm said state of health of one sensor of the front vibration sensor and the rear vibration sensor once the one sensor exhibits the same state of health three times consecutively.

6. The process according to claim 1, wherein the processing unit determines the state of health of one sensor of the front vibration sensor and the rear vibration sensor as poor when the average values of the vibration levels of the low-pressure body are less than a predetermined vibratory threshold and determines the state of health of the one sensor as good when the average values of the vibration levels of the low-pressure body are greater than the predetermined vibratory threshold,
wherein the predetermined vibratory threshold for the low-pressure body is 0.1 and 0.2 cm/s.

7. The process according to claim 6, wherein the predetermined vibratory threshold for the low-pressure body is 0.16 cm/s.

8. The process according to claim 1, wherein the processing unit determines the state of health of one sensor of the front vibration sensor and the rear vibration sensor as poor when the average values of the vibration levels of the high-pressure body are less than a predetermined vibratory threshold and determines the state of health of the one sensor as good when the average values of the vibration levels of the high-pressure body are greater than the predetermined vibratory threshold,
wherein the predetermined vibratory threshold for the high-pressure body is between 0.05 and 0.15 cm/s.

9. The process according to claim 8, wherein the predetermined vibratory threshold for the high-pressure body is 0.10 cm/s.

10. The process according to claim 1, wherein the predetermined range for the low-pressure speed is between 10500 rpm and 13500 rpm and wherein the predetermined range for the high-pressure speed is between 14500 rpm and 17500 rpm.

11. A bypass turbomachine comprising a processing unit configured to execute the process according to claim 1.

12. The process according to claim 1, wherein determining the average of the vibration levels comprises determining, by the processing unit, instantaneous average values for each of n steps over a period.

13. The process according to claim 1, wherein determining the average of the vibration levels comprises determining, by the processing unit, the average of the vibration levels from all values of the vibratory levels that have been acquired and stored progressively over a period.

14. A bypass turbomachine comprising:
a low-pressure body;
a high-pressure body;
at least two vibration sensors including:
at least one front vibration sensor at a front of the bypass turbomachine that measures front vibration levels of the low-pressure body and the high-pressure body at the front of the turbomachine, and
at least one rear vibration sensor at a rear of the bypass turbomachine that measures rear vibration levels of the low-pressure body and the high-pressure body at the rear of the turbomachine; and
a processing unit that communicates with the at least two vibration sensors and is configured to:
receive a low-pressure speed from the low-pressure body and a high-pressure speed from the high-pressure body;
when both the low-pressure speed and the high-pressure speed are simultaneously within respective ranges, average the front vibration levels and the rear vibration levels over a reception period;
when both the low-pressure speed and the high-pressure speed are not simultaneously within the respective ranges, interrupt reception of the vibration levels from the front vibration sensor and the rear vibration sensor such that the vibration levels from the front vibration sensor and the rear vibration sensor are not used in the average over the reception period; and
determine a state of health of at least one of the front vibration sensor or the rear vibration sensor based on the average over the reception period.

15. The bypass turbomachine according to claim 14, wherein the at least one front vibration sensor comprises two front vibration sensors, and wherein the at least one rear vibration sensor comprises two rear vibration sensors.

* * * * *